Jan. 1, 1929.                                             1,697,751
B. F. BLAKE
FLOWERPOT COVER
Filed Jan. 18, 1926
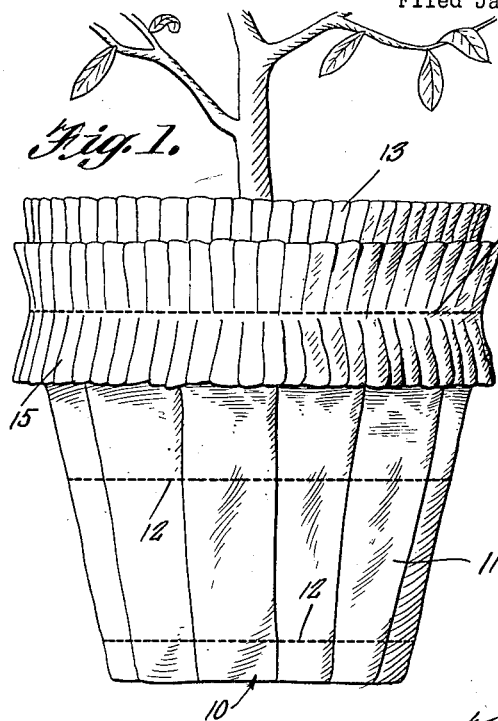
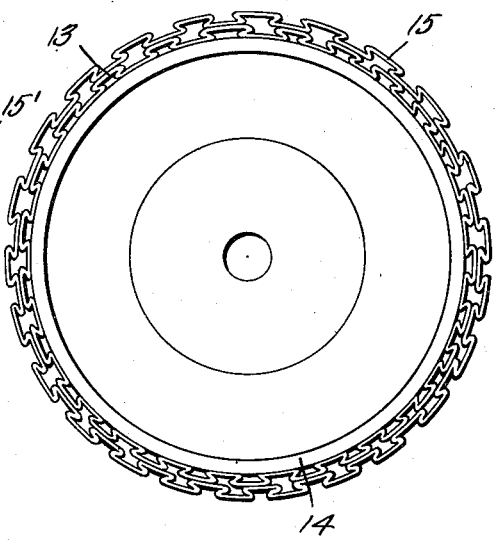
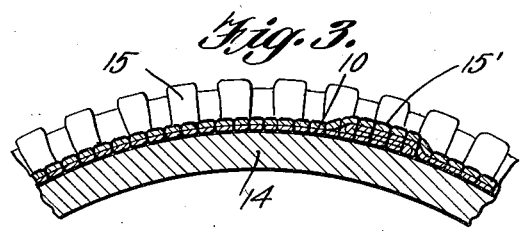
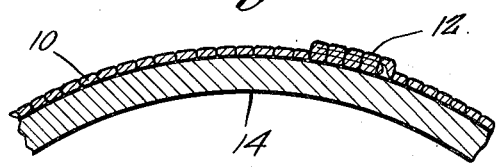
Benjamin F. Blake,
INVENTOR Patented Jan. 1, 1929.

1,697,751

UNITED STATES PATENT OFFICE.

BENJAMIN F. BLAKE, OF MARION, OHIO.

FLOWERPOT COVER.

Application filed January 18, 1926. Serial No. 82,170.

This invention relates to improvements in covers for use upon flower pots or the like preferably formed of crepe paper having its major portion plaited while its upper edge is crimped to form an attractive design upon the periphery of the flower pot.

Another object of my invention comprehends crimped strips sewed or otherwise secured to the cover adjacent the upper edge thereof and which may be of a varied color with respect to the cover in order that a multiplicity of colors may be combined to effect a neat appearance to the pot.

With the above and other objects in view, the invention further includes the following novel features and details of construction, to be hereinafter more fully described, illustrated in the accompanying drawings and pointed out in the appended claim.

In the drawing:—

Figure 1 is an elevation of my invention as applied upon the flower pot.

Figure 2 is a top plan view of a flower pot with my invention applied for use in conjunction therewith.

Figure 3 is a sectional view taken through the periphery of a flower pot and illustrating the manner in which the cover is formed and secured thereto.

Figure 4 is a similar view taken through a lower portion of the cover and pot and the seam for the cover.

Referring to the drawing in detail, wherein like characters of reference denote corresponding parts, the reference character 10 indicates a cover preferably formed of crepe paper having a plurality of longitudinally disposed plaits 11 stitched as at 12 transversely thereof. The adjacent and meeting ends of such cover 10 are stitched in overlapping relation as indicated at 12' in Figure 4 of the drawing, the edge of the cover 10 being crimped as indicated at 13 adjacent the periphery of a flow pot 14. Crimped strips 15 may be stitched to the outer side of the cover 10, as indicated at 15', adjacent the upper edge thereof and which are preferably of a varied color with respect to the cover 10 to produce a neat appearance to the flower pot 14 in general.

It will thus be noted from the foregoing description and accompanying drawing that the cover owing to the construction thereof may be manufactured, in great numbers at a very nominal cost, and in sizes equivalent to the standard types of flower pot. The cover may be readily and easily applied to pots without the usual necessity of cutting crepe paper, applying it through a flower pot and tying a bow upon the paper so arranged, which frequently is of such fragile characteristics that it tears and breaks, the operation of tying the bow often disfigures the bow after being tied inasmuch as the paper if pulled will become crimped.

The invention is susceptible of various changes in its form, proportions and minor details of construction, and the right is herein reserved to make such changes as properly fall within the scope of the appended claim.

Having thus described the invention, what is claimed is:—

A cover for use upon flower pots comprising a strip, plaits disposed longitudinally of and stitched transversely upon the cover to preserve the order thereof, the ends of the cover being disposed in overlapping relation and stitched to resemble another of the plaits, crimped portions formed upon the upper end of the cover and plaits, a strip disposed horizontally of the cover and having its upper edge disposed in spaced relation to the crimped portions thereof, and said strip being crimped upon the upper and lower side edges thereof and stitched centrally upon the cover and transversely thereof to flare the side edges outwardly from said cover.

In testimony whereof I affix my signature.

BENJAMIN F. BLAKE.